(12) United States Patent
Jeong et al.

(10) Patent No.: US 12,464,004 B1
(45) Date of Patent: Nov. 4, 2025

(54) METHOD AND SYSTEM FOR IDENTIFYING ATTACK INFRASTRUCTURE

(71) Applicant: KOREA INTERNET & SECURITY AGENCY, Naju-si (KR)

(72) Inventors: Jae Han Jeong, Naju-si (KR); Woong Go, Naju-si (KR); Sam Shin Shin, Naju-si (KR); Sung Taek Oh, Naju-si (KR); Su Jeong Kim, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 0 days.

(21) Appl. No.: 19/037,886

(22) Filed: Jan. 27, 2025

(30) Foreign Application Priority Data

Dec. 27, 2024 (KR) .................. 10-2024-0197988

(51) Int. Cl.
*H04L 9/40* (2022.01)
(52) U.S. Cl.
CPC ...... *H04L 63/1425* (2013.01); *H04L 63/1441* (2013.01)
(58) Field of Classification Search
CPC ............. H04L 63/1425; H04L 63/1441; H04L 63/1416; H04L 63/1408; H04L 63/1433; H04L 41/14
See application file for complete search history.

(56) References Cited

U.S. PATENT DOCUMENTS

2015/0288709 A1\* 10/2015 Singhal ............... H04L 63/1408
726/23
2015/0326609 A1\* 11/2015 Cruz Mota ......... H04W 12/122
726/1

(Continued)

FOREIGN PATENT DOCUMENTS

CN 114205128 A 3/2022
KR 100450209 B1 9/2004

(Continued)

OTHER PUBLICATIONS

Bilgin et al., "An Anomaly Detection Study for the Smart Home Environment," 2022 7th International Conference on Computer Science and Engineering (UBMK) Year: 2022 | Conference Paper | Publisher: IEEE.\*

(Continued)

*Primary Examiner* — Roderick Tolentino
(74) *Attorney, Agent, or Firm* — Studebaker Brackett PLLC

(57) ABSTRACT

There is provided a method for identifying attack infrastructure, performed by a computing system. The method may comprise collecting network traffic data of a host device that is the target of a security incident, acquiring, from the network traffic data, first data regarding port numbers recorded in the network traffic data, second data regarding protocols recorded in the network traffic data, and third data regarding textual information included in network packets recorded in the network traffic data or category information provided by network equipment, automatically identifying attack infrastructure corresponding to the first data, the second data, and the third data by using a predefined classification model and blocking network access of an Internet Protocol (IP) address associated with the attack infrastructure, wherein the attack infrastructure corresponds to resources utilized by an attacker during the security incident.

17 Claims, 6 Drawing Sheets

(56) References Cited

U.S. PATENT DOCUMENTS

| | | | |
|---|---|---|---|
| 2017/0310694 A1* | 10/2017 | Kamiya | G06F 21/561 |
| 2018/0063172 A1* | 3/2018 | Yamada | H04L 63/1433 |
| 2018/0337941 A1* | 11/2018 | Kraning | H04L 63/0227 |
| 2020/0366689 A1* | 11/2020 | Lotia | H04L 63/1483 |
| 2021/0211438 A1* | 7/2021 | Trim | G06N 20/00 |
| 2021/0211442 A1* | 7/2021 | Haga | H04L 63/1425 |
| 2021/0211448 A1* | 7/2021 | Taniguchi | H04L 63/1408 |
| 2022/0159022 A1* | 5/2022 | Aghamirzaei | G06Q 30/0248 |
| 2022/0329625 A1* | 10/2022 | Ballew | H04L 63/1483 |
| 2023/0140790 A1 | 5/2023 | Ladd et al. | |

FOREIGN PATENT DOCUMENTS

| | | |
|---|---|---|
| KR | 10-2018-0105688 A | 9/2018 |
| KR | 10-2021-0012962 A | 2/2021 |
| KR | 102655993 B1 | 4/2024 |
| KR | 10-2024-0151993 A | 10/2024 |

OTHER PUBLICATIONS

Rekha et al., "Machine Learning Approaches for Anomaly Detection in Network Security: Challenges, Methods and Advances," 2024 9th International Conference on Communication and Electronics Systems (ICCES) Year: 2024 | Conference Paper | Publisher: IEEE.*

An Office Action mailed by the Korean Intellectual Property Office on Mar. 7, 2025, which corresponds to Korean Patent Application No. 10-2024-0197988 and is related to U.S. Appl. No. 19/037,886.

* cited by examiner

_US 12,464,004 B1_

METHOD AND SYSTEM FOR IDENTIFYING ATTACK INFRASTRUCTURE

CROSS-REFERENCE TO RELATED APPLICATION

This application claims priority from Korean Patent Application No. 10-2024-0197988 filed on Dec. 27, 2024 in the Korean Intellectual Property Office, and all the benefits accruing therefrom under 35 U.S.C. 119, the contents of which in its entirety are herein incorporated by reference.

BACKGROUND

1. Field

The present disclosure relates to the field of cybersecurity and threat intelligence technologies, and more specifically, to a method and system for identifying attack infrastructure used by an attacker based on network traffic information.

2. Description of the Related Art

When an attacker (e.g., a hacker) attacks a network, it is necessary to identify the resources (e.g., Internet Protocol (IP) address, domain name, etc.) used by the attacker to respond effectively. An existing security system primarily focuses on analyzing the attacker's behavior on the user' computer (or host) to deduce the attack pattern. However, methods for systematically analyzing the resources used by the attacker on the network are lacking.

SUMMARY

An objective of the present disclosure is to provide a method and system for identifying attack infrastructure.

Another objective of the present disclosure is to provide a method and system for identifying attack infrastructure, which can offer a classification model that automatically identifies the resources used by an attacker on a network during a security incident.

The objectives of the present disclosure are not limited to those mentioned above, and other objectives not explicitly stated will be clearly understood by those skilled in the art based on the following description.

According to an aspect of the present disclosure, there is provided a method for identifying attack infrastructure, performed by a computing system. The method may comprise collecting network traffic data of a host device that is the target of a security incident; acquiring, from the network traffic data, first data regarding port numbers recorded in the network traffic data, second data regarding protocols recorded in the network traffic data, and third data regarding textual information included in network packets recorded in the network traffic data or category information provided by network equipment; automatically identifying attack infrastructure corresponding to the first data, the second data, and the third data by using a predefined classification model; and blocking network access of an Internet Protocol (IP) address associated with the attack infrastructure, wherein the attack infrastructure corresponds to resources utilized by an attacker during the security incident.

In some embodiments, the attack infrastructure may include first attack infrastructure, which is a resource owned by the attacker to attack a network that includes the host device.

In some embodiments, the first attack infrastructure may include at least one of Virtual Private Network (VPN), The Onion Router (TOR), proxy, Layer 2 Tunneling Protocol (L2TP), Point-to-Point Tunneling Protocol (PPTP), and botnet.

In some embodiments, the attack infrastructure may include second attack infrastructure, which is a resource owned by a third party other than the attacker and compromised by the attacker.

In some embodiments, the second attack infrastructure may include at least one of Network-Attached Storage (NAS), malware, web hosting, Domain Name System (DNS), Network Time Protocol (NTP) server, and network equipment.

In some embodiments, the method may further comprise mapping the identified attack infrastructure to Tactics, Techniques, and Procedures (TTPs) in the MITRE Adversarial Tactics, Techniques, and Common Knowledge (ATT&CK) framework.

In some embodiments, the automatically identifying the attack infrastructure may comprise updating the predefined classification model automatically if the attack infrastructure corresponding to the first data, the second data, and the third data is not defined in the predefined classification model.

In some embodiments, the automatically identifying the attack infrastructure may comprise acquiring an IP address of the attacker who has used the attack infrastructure; collecting first network traffic data associated with the acquired IP address; acquiring, from the first network traffic data, first derived data regarding port numbers recorded in the first network traffic data, second derived data regarding protocols recorded in the first network traffic data, and third derived data regarding textual information included in network packets recorded in the first network traffic data or category information provided by network equipment; and automatically identifying third attack infrastructure corresponding to the first derived data, the second derived data, and the third derived data by using the predefined classification model.

According to another aspect of the present disclosure, there is provided a system for identifying attack infrastructure. The system may comprise a communication interface; a memory in which a computer program is loaded; and at least one processor executing the computer program, wherein the computer program includes instructions for performing the operations of: collecting network traffic data of a host device that is the target of a security incident; acquiring, from the network traffic data, first data regarding port numbers recorded in the network traffic data, second data regarding protocols recorded in the network traffic data, and third data regarding textual information included in network packets recorded in the network traffic data or category information provided by network equipment; automatically identifying attack infrastructure corresponding to the first data, the second data, and the third data by using a predefined classification model; and blocking network access of an Internet Protocol (IP) address associated with the attack infrastructure, and the attack infrastructure corresponds to resources utilized by an attacker during the security incident.

In some embodiments, the attack infrastructure may include first attack infrastructure, which is a resource owned by the attacker to attack a network that includes the host device.

In some embodiments, the first attack infrastructure may include at least one of Virtual Private Network (VPN), The Onion Router (TOR), proxy, Layer 2 Tunneling Protocol (L2TP), Point-to-Point Tunneling Protocol (PPTP), and botnet.

In some embodiments, the attack infrastructure may include second attack infrastructure, which is a resource owned by a third party other than the attacker and compromised by the attacker.

In some embodiments, the second attack infrastructure may include at least one of Network-Attached Storage (NAS), malware, web hosting, Domain Name System (DNS), Network Time Protocol (NTP) server, and network equipment.

In some embodiments, the computer program may further include instructions for performing the operation of mapping the identified attack infrastructure to Tactics, Techniques, and Procedures (TTPs) in the MITRE Adversarial Tactics, Techniques, and Common Knowledge (ATT&CK) framework.

In some embodiments, the operation of automatically identifying the attack infrastructure may include updating the predefined classification model automatically if the attack infrastructure corresponding to the first data, the second data, and the third data is not defined in the predefined classification model.

In some embodiments, the operation of automatically identifying the attack infrastructure may include acquiring an IP address of the attacker who has used the attack infrastructure; collecting first network traffic data associated with the acquired IP address; acquiring, from the first network traffic data, first derived data regarding port numbers recorded in the first network traffic data, second derived data regarding protocols recorded in the first network traffic data, and third derived data regarding textual information included in network packets recorded in the first network traffic data or category information provided by network equipment; and automatically identifying third attack infrastructure corresponding to the first derived data, the second derived data, and the third derived data by using the predefined classification model.

According to still another aspect of the present disclosure, there is provided a computer program stored in a computer-readable recording medium, the computer program, when combined with a computing device, executing the steps of: collecting network traffic data of a host device that is the target of a security incident; acquiring, from the network traffic data, first data regarding port numbers recorded in the network traffic data, second data regarding protocols recorded in the network traffic data, and third data regarding textual information included in network packets recorded in the network traffic data or category information provided by network equipment; automatically identifying attack infrastructure corresponding to the first data, the second data, and the third data by using a predefined classification model; and blocking network access of an Internet Protocol (IP) address associated with the attack infrastructure, wherein the attack infrastructure corresponds to resources utilized by an attacker during the security incident.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
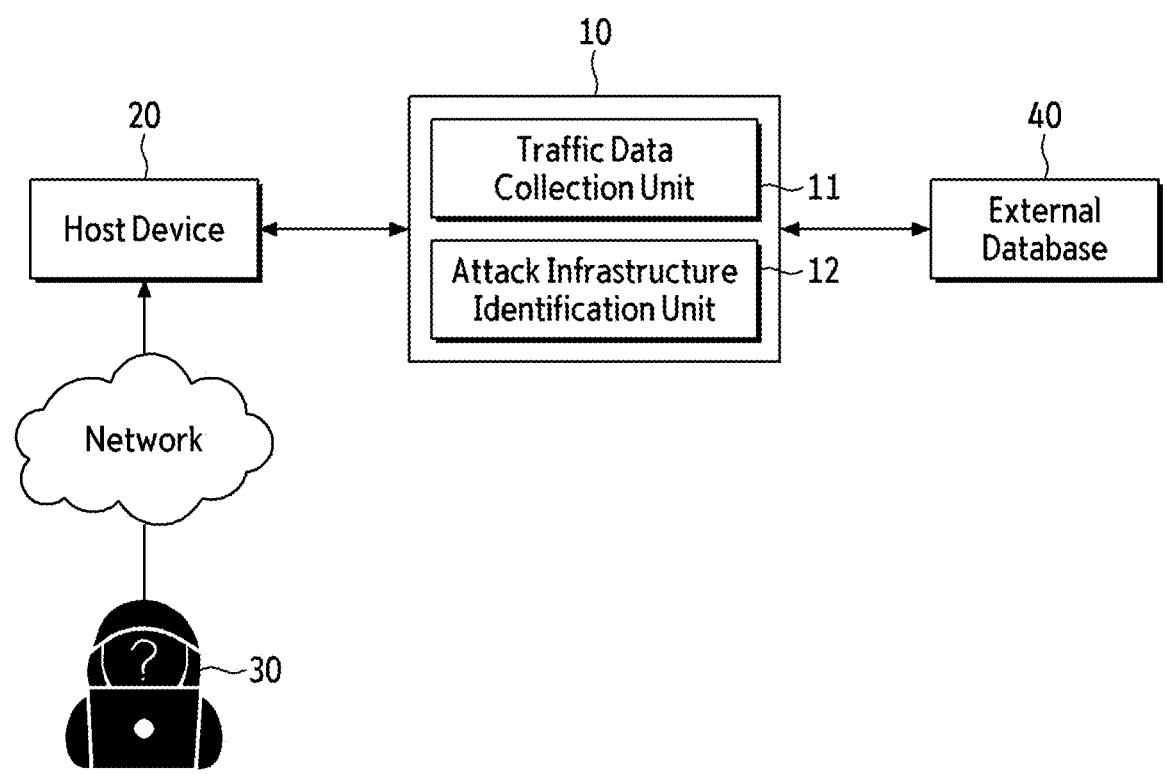
FIG. 1 is a system configuration diagram illustrating the configuration and operation of a security incident analysis system according to some embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

The configuration and operation of a security incident analysis system according to some embodiments of the present disclosure will hereinafter be described with reference to FIG. 1. FIG. 1 is a system configuration diagram illustrating the configuration and operation of the security incident analysis system according to some embodiments of the present disclosure.

Referring to FIG. 1, the security incident analysis system according to some embodiments of the present disclosure may include an attack infrastructure identification system 10, a host device 20, an attacker terminal 30, and an external database 40. The attack infrastructure identification system 10 may include a traffic data collection unit 11 and an attack infrastructure identification unit 12. However, the scope of the present disclosure is not limited to this. The security incident analysis system according to some embodiments of the present disclosure may further include modules, devices, or systems not illustrated in FIG. 1 or may exclude at least some of the attack infrastructure identification system 10, the host device 20, the attacker terminal 30, and the external database 40 depicted in FIG. 1.

The attacker terminal 30 may attack (e.g., hack) the host device 20 through a network. The attacker terminal 30, which is a device used by an attacker, may use a variety of attack infrastructure to attack the host device 20, as will be described later.

The host device 20 may be a computer or system subjected to a security incident. That is, the host device 20 may be the target device that the attacker terminal 30 attempts to infiltrate to execute malware or steal information. The attacker terminal 30 may access the host device 20 via the network.

The attack infrastructure may be resources existing on the network used by the attacker terminal 30 to attack the host device 20. The network may be an internal network of a specific organization to which the host device 20 belongs or an external network connected to the organization.

When the host device 20 is attacked by the attacker terminal 30, the host device 20 may collect a series of network traffic data related to the security incident and store the network data in a database (not illustrated). The network traffic data may be records and information on all data flows transmitted or received by the attacker terminal 30 over the network. The host device 20 may analyze the network traffic data based on data contained in network packets. For example, the network traffic data may include Internet Protocol (IP) addresses, the identifier of the host device 20, port numbers and protocols used by the attacker terminal 30, and category information.

The category information may include a series of textual information recorded in the network packets in the network traffic data or information provided by the host device 20. The textual information, which is part of data transmitted through the network packets, may be information used to infer or classify the content of communication. For example, the textual information may correspond to header information or payload information of the network packets.

The information provided by the host device 20 may include log records provided by network equipment. For example, the information provided by the host device 20 may include firewall logs or logs from routers/switches.

The traffic data collection unit 11 may collect the network traffic data of the host device 20 that is the target of the security incident. The traffic data collection unit 11 may capture all network traffic generated by the host device 20 to collect the network traffic data. Alternatively, the traffic data collection unit 11 may collect the network traffic data through all system logs generated by the host device 20.

The attack infrastructure identification unit 12 may acquire, from the network traffic data, first data regarding port numbers recorded in the network traffic data, second data regarding protocols recorded in the network traffic data, and third data regarding textual information included in the network packets recorded in the network traffic data or category information provided by network equipment. The attack infrastructure identification unit 12 may directly extract the first data from the network traffic data. The attack infrastructure identification unit 12 may acquire the second data from the network traffic data using a network capture tool. The attack infrastructure identification unit 12 may acquire the third data from the network traffic data using payload analysis, IDS/IPS detection results, or an AI analysis tool.

The attack infrastructure identification unit 12 may automatically identify attack infrastructure corresponding to the first data, second data, and third data by using a predefined classification model. The predefined classification model will be described later in detail with reference to FIGS. 3 through 5.

The attack infrastructure identification unit 12 may block network access of IP addresses associated with the identified attack infrastructure. By blocking the network access of the IP addresses associated with the identified attack infrastructure, the attack infrastructure identification unit 12 can promptly terminate malicious activity in network security and prevent further propagation of breaches and damage. Through this, the attack infrastructure identification unit 12 can effectively sever connections with attackers, thereby safeguarding the organization's network and systems.

Each of the traffic data collection unit 11 and the attack infrastructure identification unit 12 of the attack infrastructure identification system 10 may be implemented using at least one computing device. For example, all the functions of the attack infrastructure identification system 10 may be implemented in a single computing device, or a first function of the attack infrastructure identification system 10 may be implemented in a first computing device, while a second function of the attack infrastructure identification system 10 is implemented in a second computing device. Alternatively, a specific function of the attack infrastructure identification system 10 may be implemented across multiple computing devices.

The external database 40 may be a device for storing threat intelligence data. The threat intelligence data systematically collects, analyzes, and shares information related to current and potential security threats in cybersecurity, including information and guidelines for defending against attackers, malicious activities, attack infrastructure, and vulnerabilities. The threat intelligence data may include various data such as IP addresses associated with malicious activities, domains used for hosting malware or phishing websites, security vulnerability information of software or systems, tactics, techniques, and procedures (TTPs) employed by attackers, and behavioral analysis data analyzing the actions of a specific attack infrastructure (e.g., IPs or domains).

The attack infrastructure identification system 10 may refer to the threat intelligence data stored in the external database 40 to query or update latest threat information on classifiable attack infrastructure according to the predefined classification model. Accordingly, the attack infrastructure identification system 10 can enhance the accuracy of prediction results for attack infrastructure and reflect the latest information by linking with external data.

According to the present embodiment, resources used by an attacker on a network during a security incident can be automatically classified according to a predefined classification model. Thus, the resources used by the attacker can be quickly identified, strengthening the security of network devices, including the host device 20.

Furthermore, according to the present embodiment, the attack infrastructure identification system 10 can enhance the accuracy of prediction results for attack infrastructure and reflect the latest information by linking with the threat intelligence data stored in the external database 40.

For ease of understanding, it is assumed that all steps/operations of methods to be described later are performed by the attack infrastructure identification system 10. Therefore, even if the agent for a specific step/operation is omitted, it may be understood that the specific step/operation is performed by the attack infrastructure identification system 10. However, in actual environments, some steps/operations of the methods to be described later may be performed by other computing devices.

Figure 2:
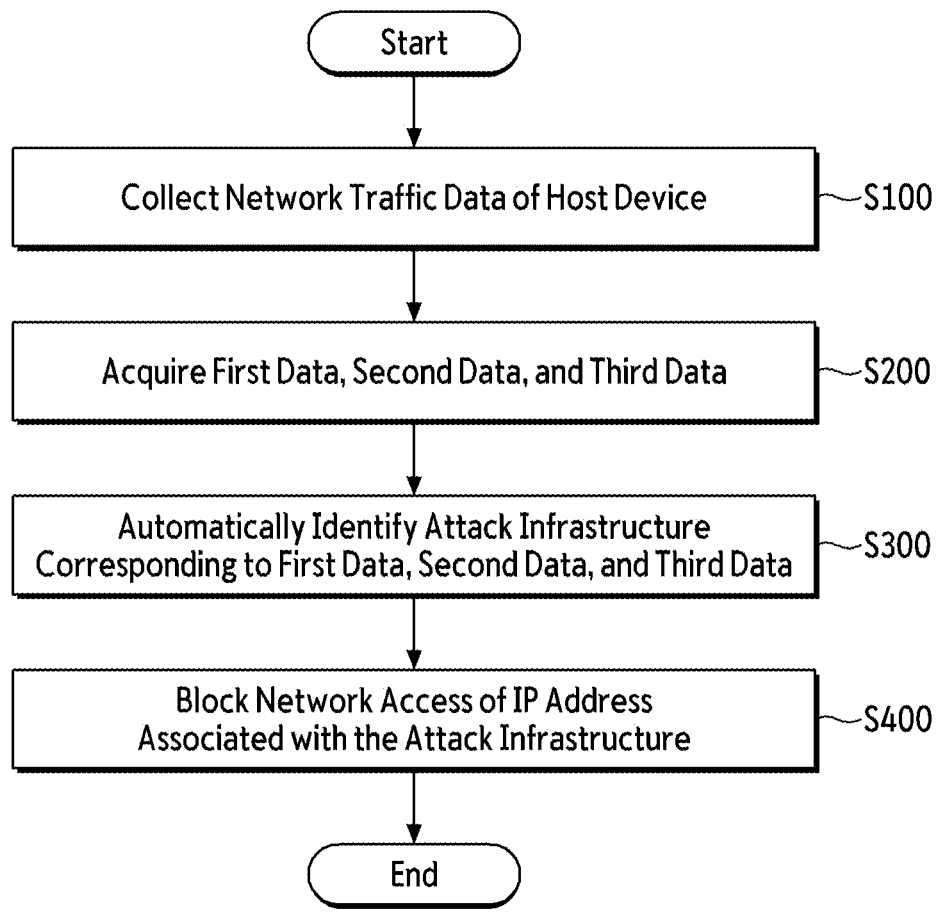
FIG. 2 is a flowchart illustrating a method for identifying attack infrastructure according to some embodiments of the present disclosure.

A method for identifying attack infrastructure according to some embodiments of the present disclosure will hereinafter be described with reference to FIG. 2. FIG. 2 is a flowchart illustrating the method for identifying attack infrastructure according to some embodiments of the present disclosure.

Referring to FIG. 2, the traffic data collection unit 11 may collect network traffic data of the host device 20, which is the target of a security incident (S100). The network traffic data may include records and information on all data flows transmitted or received by the attacker terminal 30 over the network. For example, the network traffic data may include IP addresses, the identifier of the host device 20, port numbers and protocols used by the attacker terminal 30, and category information.

The category information may include a series of textual information recorded in network packets in the network traffic data or information provided by network equipment. The textual information, which is part of data transmitted through the network packets, may be information used to infer or classify the content of communication. For example, the textual information may correspond to header information or payload information of the network packets. The information provided by the network equipment may include log records provided by the network equipment. For example, the information provided by the host device 20 may include firewall logs, router logs, or switch logs.

The traffic data collection unit 11 may collect the network traffic data by capturing all network traffic generated by the host device 20. Alternatively, the traffic data collection unit 11 may collect the network traffic data through all system logs generated by the host device 20. However, the scope of the present disclosure is not limited to this.

The attack infrastructure identification unit 12 may acquire, from the network traffic data, first data regarding port numbers recorded in the network traffic data, second data regarding protocols recorded in the network traffic data, and third data regarding textual information included in network packets recorded in the network traffic data or category information provided by network equipment (S200).

The attack infrastructure identification unit 12 may directly extract the first data from the network traffic data. The attack infrastructure identification unit 12 may acquire the second data from the network traffic data using a network capture tool. The attack infrastructure identification unit 12 may acquire the third data from the network traffic data using payload analysis, IDS/IPS detection results, or an AI analysis tool.

The attack infrastructure identification unit 12 may automatically identify attack infrastructure corresponding to the first data, the second data, and the third data by using a predefined classification model (S300). The attack infrastructure, which refers to resources used by an attacker for attacking the host device 20 via the network, may correspond to resources existing on the network used by the attacker terminal 30 to attack the host device 20. Here, the network may be an internal network of a specific organization to which the host device 20 belongs or an external network connected to the organization. Among the attack infrastructure defined in the predefined classification model, the attack infrastructure identification unit 12 may determine a specific attack infrastructure matching all the first data, the second data, and the third data.

Thereafter, the attack infrastructure identification unit 12 may block network access of IP addresses associated with the identified attack infrastructure (S400). By blocking the network access of IP addresses associated with the identified attack infrastructure, the attack infrastructure identification unit 12 can promptly terminate malicious activities in network security and prevent further propagation of breaches and damage.

In one embodiment, the attack infrastructure identification unit 12 may extract IP addresses associated with the resources corresponding to the identified attack infrastructure based on the results of analysis of the network traffic data and add the extracted IP addresses to a blacklist. The attack infrastructure identification unit 12 may then automatically generate and deploy a blocking rule to a defense system such as a firewall, intrusion prevention system (IPS), or DNS filtering system. Thereafter, the attack infrastructure identification unit 12 may drop all traffic from the blocked IP addresses or apply restrictions to specific ports and protocols to block network access. Additionally, the attack infrastructure identification unit 12 may record detailed information on the blocked IP addresses and notify a security management system to enable further analysis and response.

According to the present embodiment, the organization's network and systems can be effectively safeguarded, and connections with attackers can be effectively severed.

Figure 3:
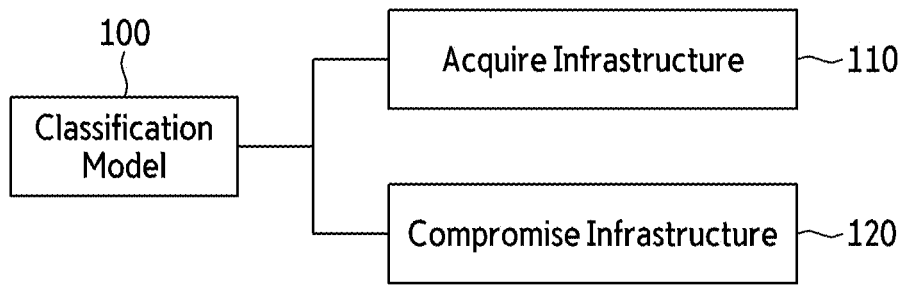
FIG. 3 is a diagram illustrating the major classification of a classification model referenced by some embodiments of the present disclosure.

The predefined classification model will hereinafter be described with reference to FIG. 3. FIG. 3 is a diagram illustrating the major classification of a classification model referenced by some embodiments of the present disclosure.

Referring to FIG. 3, attack infrastructure defined in a classification model 100 may include a first attack infrastructure 110 ("Acquire Infrastructure"), which consists of resources owned by an attacker, the agent of a security incident, to attack the network to which the host device 20 belongs, and a second attack infrastructure 120 ("Compromise Infrastructure"), which consists of resources owned by a third party other than the attacker and compromised by the attacker.

The first attack infrastructure 110 may refer to resources directly purchased, configured, or leased by the attacker to perform malicious activities. The attacker may use the first attack infrastructure 110 to enhance anonymity, hide activities within the network, or establish a foundation for attacks.

The second attack infrastructure 120 may refer to compromised systems not directly owned by the attacker. The attacker may exploit the second attack infrastructure 120 to perform malicious activities or use the second attack infrastructure 120 as a foothold for further attacks.

Figure 4:
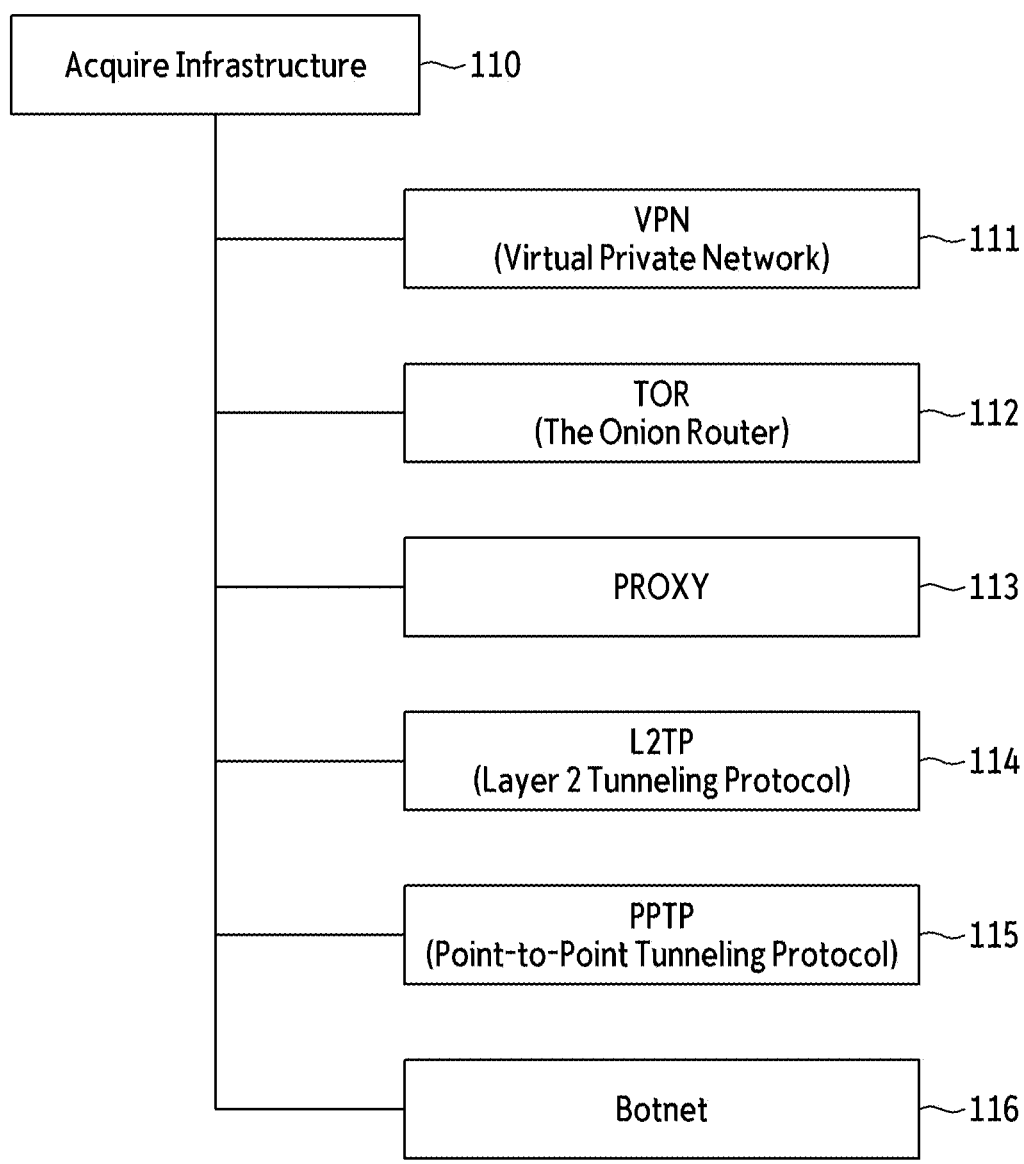
FIG. 4 is a diagram illustrating first attack infrastructure referenced by some embodiments of the present disclosure.

First attack infrastructure referenced by some embodiments of the present disclosure will hereinafter be described with reference to FIG. 4. FIG. 4 is a diagram illustrating the first attack infrastructure referenced by some embodiments of the present disclosure.

Referring to FIG. 4, the first attack infrastructure 110 may include at least one of Virtual Private Network (VPN) 111, The Onion Router (TOR) 112, Proxy 113, Layer 2 Tunneling Protocol (L2TP) 114, Point-to-Point Tunneling Protocol (PPTP) 115, and Botnet 116. However, the scope of the present disclosure is not limited to this, and the types of attack infrastructure included in the first attack infrastructure 110 may be periodically updated.

VPN 111 may function to hide the user's IP address and encrypt traffic to protect internet activities. However, the attacker may misuse this functionality to conceal their location and activities, enabling them to attempt attacks without leaving traces. Thus, suspicious activities involving VPN 111 need to be continuously tracked and monitored. Since VPN-based malicious activities can come in various forms, security administrators are required to analyze related patterns and prepare measures to preemptively block potential threats.

VPN 111, as a resource owned by the attacker, may serve as attack infrastructure for attacking the network to which the host device 20 belongs.

VPN 111-related attack infrastructure corresponding to the first data, second data, and third data will hereinafter be described.

| 1. astrill-vpn | |
|---|---|
| Feature | Value |
| Category | vpn.astrill-vpn |
| Port No. | 443 |
| Protocol | 6 |

When the first data is '443,' the second data is '6,' and the third data is 'vpn.astrill-vpn,' the VPN 111-related attack infrastructure corresponding to the first data, the second data, and the third data may be classified as 'astrill-vpn.'

| 2. adguard-vpn | |
|---|---|
| Feature | Value |
| Category | vpn.adguard-vpn |
| Port No. | 443 |
| Protocol | 6 |

When the first data is '443,' the second data is '6,' and the third data is 'vpn.adguard-vpn,' the VPN 111-related attack infrastructure corresponding to the first data, the second data, and the third data may be classified as 'adguard-vpn.'

| 3. openvpn | |
|---|---|
| Feature | Value |
| Category | vpn.openvpn |
| Port No. | 1194 |
| Protocol | TCP |

When the first data is '1194,' the second data is 'TCP,' and the third data is 'vpn.openvpn,' the VPN 111-related attack infrastructure corresponding to the first data, the second data, and the third data may be classified as 'openvpn.'

| 4. itop-vpn | |
|---|---|
| Feature | Value |
| Category | vpn.itop-vpn |
| Port No. | 9876 |
| Protocol | TCP |

When the first data is '9876,' the second data is 'TCP,' and the third data is 'vpn.itop-vpn,' the VPN 111-related attack infrastructure corresponding to the first data, the second data, and the third data may be classified as 'itop-vpn.'

| 5. airvpn | |
|---|---|
| Feature | Value |
| Category | vpn.air-vpn |
| Port No. | 443 |
| Protocol | TCP |

When the first data is '443,' the second data is 'TCP,' and the third data is 'vpn.air-vpn,' the VPN 111-related attack infrastructure corresponding to the first data, the second data, and the third data may be classified as 'airvpn.'

| 6. surfshark | |
|---|---|
| Feature | Value |
| Category | vpn.surfshark-vpn |
| Port No. | 443—TCP |
|  | 1194—UDP |
| Protocol | TCP |

When the first data is '443' or '1194,' the second data is 'TCP,' and the third data is 'vpn.surfshark-vpn,' the VPN 111-related attack infrastructure corresponding to the first data, the second data, and the third data may be classified as 'surfshark.'

| 7. windscribe | |
|---|---|
| Feature | Value |
| Category | vpn.windscribe |
| Port No. | 443 |
| Protocol | TCP |

When the first data is '443,' the second data is 'TCP,' and the third data is 'vpn.windscribe,' the VPN 111-related attack infrastructure corresponding to the first data, the second data, and the third data may be classified as 'windscribe.'

| 8. expressvpn | |
| --- | --- |
| Feature | Value |
| Category | vpn.expressvpn |
| Port No. | 443 |
| Protocol | TCP |

When the first data is '443,' the second data is 'TCP,' and the third data is 'vpn.expressvpn,' the VPN 111-related attack infrastructure corresponding to the first data, the second data, and the third data may be classified as 'expressvpn.'

| 9. touchvpn | |
| --- | --- |
| Feature | Value |
| Category | vpn.touchvpn |
| Port No. | 443 |
| Protocol | TCP |

When the first data is '443,' the second data is 'TCP,' and the third data is 'vpn.touchvpn,' the VPN 111-related attack infrastructure corresponding to the first data, the second data, and the third data may be classified as 'touchvpn.'

| 10. touchvpn | |
| --- | --- |
| Feature | Value |
| Category | vpn.n-vpn |
| Port No. | 443 |
| Protocol | TCP |

When the first data is '443,' the second data is 'TCP,' and the third data is 'vpn.n-vpn,' the VPN 111-related attack infrastructure corresponding to the first data, the second data, and the third data may be classified as 'n-vpn.'

| 11. nordvpn | |
| --- | --- |
| Feature | Value |
| Category | vpn.nordvpn |
| Port No. | 443—TCP |
| | 1194—UDP |
| Protocol | TCP, UDP |

When the first data is '443' or '1194,' the second data is 'TCP' or 'UDP,' and the third data is 'vpn.nordvpn,' the VPN 111-related attack infrastructure corresponding to the first data, the second data, and the third data may be classified as 'nordvpn.'

TOR 112-related attack infrastructure corresponding to the first data, the second data, and the third data will hereinafter be described.

TOR 112, which is a network providing user anonymity, is capable of concealing personal information by transmitting user traffic through multiple relay servers. TOR 112 protects data with multiple layers of encryption, hiding the user's IP address and enabling secure online activity. However, the attacker may misuse TOR 112 to conceal illegal activities such as hacking or drug trafficking. The attacker may evade law enforcement tracking and access illegal sites using the anonymity of TOR 112. Therefore, malicious activities involving TOR 112 require continuous monitoring and analysis.

TOR 112, as a resource owned by the attacker, may serve as attack infrastructure for attacking the network to which the host device 20 belongs.

| Feature | Value |
| --- | --- |
| Category | Tor |
| Port No. | 80 |
| | 443 |
| | 9001 |
| Protocol | TCP |

When the first data is '80,' '443,' or '9001,' the second data is 'TCP,' and the third data is 'tor,' the attack infrastructure corresponding to the first data, the second data, and the third data may be classified as TOR 112.

Proxy 113-related attack infrastructure corresponding to the first data, the second data, and the third data will hereinafter be described.

Proxy 113, which refers to a server that acts as an intermediary between a client and a server, allows the user to relay their requests therethrough when accessing the internet. Proxy 113 is used to hide the user's IP address and perform web requests on their behalf, providing security and anonymity. The attacker may exploit Proxy 113 to attempt hacking or distribute malicious software. Therefore, suspicious activities involving Proxy 113 require continuous monitoring.

Proxy 113, as a resource owned by the attacker, may serve as attack infrastructure for attacking the network to which the host device 20 belongs.

| Feature | Value |
| --- | --- |
| Category | proxy |
| Port No. | 80 |
| | 443 |
| Protocol | TCP |

When the first data is '80' or '443,' the second data is 'TCP,' and the third data is 'proxy,' the attack infrastructure corresponding to the first data, the second data, and the third data may be classified as Proxy 113.

L2TP 114-related attack infrastructure corresponding to the first data, the second data, and the third data will hereinafter be described.

L2TP 114, which refers to one of the VPN technologies, can provide data encryption functions to enhance the security of data transmission. However, L2TP 114 lacks encryption on its own and enhances security only when used in conjunction with IPsec. Consequently, the attacker may exploit L2TP 114 for unencrypted data transmission or attempt to bypass VPN connections. Therefore, environments using L2TP 114 require continuous monitoring and security reinforcements to prevent potential threats.

L2TP 114, as a resource owned by the attacker, may serve as attack infrastructure for attacking the network to which the host device 20 belongs.

| Feature | Value |
| --- | --- |
| Category | vpn.l2tp |
| Port No. | 1701 |
| | 500 |
| | 4500 |
| Protocol | UDP |

When the first data is '1701,' '500,' or '4500,' the second data is 'UDP,' and the third data is 'vpn.l2tp,' the attack infrastructure corresponding to the first data, the second data, and the third data may be classified as L2TP 114.

PPTP 115-related attack infrastructure corresponding to the first data, the second data, and the third data will hereinafter be described.

PPTP 115 refers to a VPN protocol that uses tunneling technology to securely transmit user data. While PPTP 115 aims to enhance security by encrypting data during internet transmission, it is considered less reliable compared to modern VPN protocols due to its relatively low security levels and vulnerabilities. The attacker may exploit PPTP 115 to conceal their identity and conduct illegal activities (e.g., hacking, spamming, or distributing malicious software).

PPTP 115, as a resource owned by the attacker, may serve as attack infrastructure for attacking the network to which the host device 20 belongs.

| Feature | Value |
|---|---|
| Category | vpn.pptp |
| Port No. | 1723 |
| Protocol | TCP |

When the first data is '1723,' the second data is 'TCP,' and the third data is 'vpn.pptp,' the attack infrastructure corresponding to the first data, the second data, and the third data may be classified as PPTP 115.

Botnet 116-related attack infrastructure corresponding to the first data, the second data, and the third data will hereinafter be described.

Botnet 116 refers to a network of infected devices used to conduct large-scale malicious activities. The attacker may leverage Botnet 116 to execute illegal activities such as Distributed Denial of Service (DDOS) attacks, spam dissemination, or data theft. Botnet 116 typically consists of devices infected without the user's awareness. Communication with Botnet 116 suggests that the relevant IPs may be infected with malware or under the control of Botnet 116. The attacker may utilize Botnet 116 to carry out large-scale attacks, compromising systems across the network, including the host device 20.

Botnet 116, as a resource owned by the attacker, may serve as attack infrastructure for attacking the network to which the host device 20 belongs.

| Feature | Value |
|---|---|
| Category | abstealer |
|  | aldibot |
|  | amadey |
|  | andromeda |
|  | azorult |
|  | banload |
|  | betabot |
|  | blackenergy |
|  | bluebot |
|  | bolek |
|  | citadel |
|  | cobaltstrike |
|  | conficker |
|  | corebot |
|  | coresys |
|  | darkcomet |
|  | diamondfox |
|  | dirtjumper |
|  | dofoil |
|  | emotet |
|  | enfal |
|  | godzilla |
|  | gozi2 |
|  | goznym |
|  | gumblar |
|  | http_post |
|  | isrstealer |
|  | jedobot |
|  | kasidet |
|  | katrina |
|  | keybase |
|  | kins |
|  | kpot |
|  | kratos |
|  | kronos |
|  | locky |
|  | lokibot |
|  | madness |
|  | marcher |
|  | matsnu |
|  | minerpanel |
|  | mirai |
|  | nanocore |
|  | neverquest |
|  | nymaim |
|  | optima |
|  | pandabanker |
|  | pandora |
|  | pincher |
|  | ponyloader |
|  | poseidon |
|  | poseidon-findstr |
|  | predatorthethief |
|  | proxyback |
|  | pua |
|  | qakbot |
|  | quant |
|  | raccoonstealer |
|  | ranbyus |
|  | redline |
|  | rovnix |
|  | smartapp |
|  | smokeloader |
|  | solar |
|  | stealrat |
|  | suprememiner |
|  | teslacrypt |
|  | tinba |
|  | trickbot |
|  | trusteer |
|  | tsunami |
|  | umbra |
|  | urlzone |
|  | vawtrak |
|  | vertexnet |
|  | xorddos |
|  | xswkit |
| Port No. | 80 |
| Protocol | TCP |

When the first data is '80,' the second data is 'TCP,' and the third data corresponds to one of the listed pieces of information, the attack infrastructure corresponding to the first data, the second data, and the third data may be classified as Botnet 116.

Figure 5:
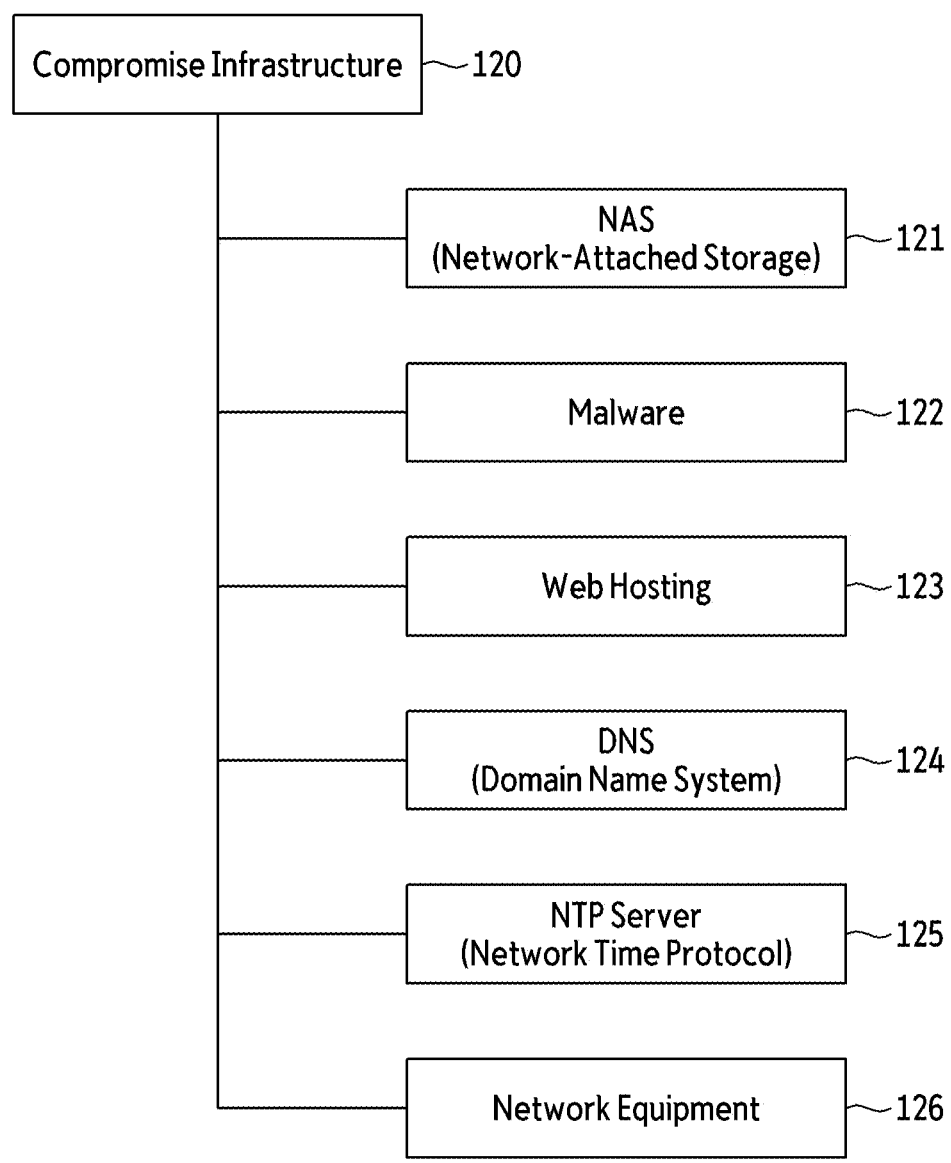
FIG. 5 is a diagram illustrating second attack infrastructure referenced by some embodiments of the present disclosure.

Second attack infrastructure referenced by some embodiments of the present disclosure will hereinafter be described with reference to FIG. 5. FIG. 5 is a diagram illustrating the second attack infrastructure referenced by some embodiments of the present disclosure.

Referring to FIG. 5, the second attack infrastructure 120 may include at least one of Network-Attached Storage (NAS) 121, Malware 122, Web Hosting 123, Domain Name System (DNS) 124, Network Time Protocol (NTP) Server 125, and Network Equipment 126. However, the scope of the present disclosure is not limited to this, and the types of attack infrastructure included in the second attack infrastructure 120 may be periodically updated.

NAS 121-related attack infrastructure corresponding to the first data, the second data, and the third data will hereinafter be described.

NAS 121 refers to a data storage device designed to allow multiple users and devices to share and access files over the network. NAS 121 provides centralized storage for purposes such as file sharing, data backup, and media streaming. While NAS 121 offers the convenience of remote access for the user, it can easily become a target for the attacker. The attacker may hack NAS 121 to access data or encrypt files using ransomware. Large data transfers or abnormal access to files stored on a network-connected storage device may indicate that the attacker is attempting to steal files from NAS 121.

NAS 121, as a resource owned by a third party other than the attacker, may serve as compromised attack infrastructure breached by the attacker.

| 1. qnap | |
|---|---|
| Feature | Value |
| Category | nas.qnap |
| Port No. | 6881-UDP |
| | 8080-TCP |
| | 443-TCP |
| Protocol | TCP, UDP |

When the first data is '6881,' '8080,' or '443,' the second data is 'TCP' or 'UDP,' and the third data is 'nas.qnap,' NAS 121-related attack infrastructure corresponding to the first data, the second data, and the third data may be classified as 'qnap.'

| 2. synology | |
|---|---|
| Feature | Value |
| Category | nas.synology |
| Port No. | 5000 |
| | 50001 |
| Protocol | TCP |

When the first data is '5000' or '5001,' the second data is 'TCP,' and the third data is 'nas.synology,' the NAS 121-related attack infrastructure corresponding to the first data, the second data, and the third data may be classified as 'synology.'

Malware 122-related attack infrastructure corresponding to the first data, the second data, and the third data will hereinafter be described.

Malware 122 refers to software that infiltrates the user's device to steal data or damage systems. Malware 122 exists in various forms and primarily communicates between infected systems and remote servers to receive commands or transfer data. This communication typically occurs over HTTP, HTTPS, or other protocols, allowing the attacker to remotely control infected systems or distribute additional malicious code. Malware 122 often causes damage to the host device 20 through activities such as data breaches, keylogging, and ransomware attacks. Monitoring communication with infected systems plays a critical role in early detection and prevention of malicious activities.

Malware 122, as a resource owned by a third party other than the attacker, may serve as compromised attack infrastructure breached by the attacker.

| Feature | Value |
|---|---|
| Category | malware |
| Port No. | — |
| Protocol | — |

The first data and the second data may be acquired by referencing the threat intelligence data stored in the external database 40. When the third data is 'malware,' the attack infrastructure corresponding to the first data, the second data, and the third data may be classified as Malware 122.

Web Hosting 123-related attack infrastructure corresponding to the first data, the second data, and the third data will hereinafter be described.

Web Hosting 123 involves providing server space and services to deploy websites on the internet. Through Web Hosting 123, the user can upload and operate their website files on servers. However, the attacker may hack hosted websites or upload malicious code to infect visitors. Additionally, the attacker may operate the hosted servers as phishing sites to steal user information or utilize them as command-and-control (C2) servers to manage malicious botnets. In some cases, the attacker may take over the servers or use them as targets for DDOS attacks through vulnerable web applications.

Web Hosting 123, as a resource owned by a third party other than the attacker, may serve as compromised attack infrastructure breached by the attacker.

| 1. digitalocean | |
|---|---|
| Feature | Value |
| Category | cloud.digitalocean |
| Port No. | 80 |
| | 443 |
| Protocol | TCP |

When the first data is '80 or '443,' the second data is 'TCP,' and the third data is 'cloud.digitalocean,' Web Hosting 123-related attack infrastructure corresponding to the first data, the second data, and the third data may be classified as 'digitalocean.'

| 2. google | |
|---|---|
| Feature | Value |
| Category | cloud.google |
| Port No. | 80 |
| | 443 |
| Protocol | TCP |

When the first data is '80 or '443,' the second data is 'TCP,' and the third data is 'cloud.google,' the Web Hosting 123-related attack infrastructure corresponding to the first data, the second data, and the third data may be classified as 'google.'

3. microsoft

| Feature | Value |
| --- | --- |
| Category | cloud.microsoft |
| Port No. | 80 |
|  | 443 |
| Protocol | TCP |

When the first data is '80 or '443,' the second data is 'TCP,' and the third data is 'cloud.microsoft,' the Web Hosting 123-related attack infrastructure corresponding to the first data, the second data, and the third data may be classified as 'microsoft.'

4. alibaba

| Feature | Value |
| --- | --- |
| Category | cloud.alibaba |
| Port No. | 80 |
|  | 443 |
| Protocol | TCP |

When the first data is '80 or '443,' the second data is 'TCP,' and the third data is 'cloud.alibaba,' the Web Hosting 123-related attack infrastructure corresponding to the first data, the second data, and the third data may be classified as 'alibaba.'

5. huawei

| Feature | Value |
| --- | --- |
| Category | cloud.huawei |
| Port No. | 80 |
|  | 443 |
| Protocol | TCP |

When the first data is '80' or '443,' the second data is 'TCP,' and the third data is 'cloud.huawei,' the Web Hosting 123-related attack infrastructure corresponding to the first data, the second data, and the third data may be classified as 'huawei.'

DNS 124-related attack infrastructure corresponding to the first data, the second data, and the third data will hereinafter be described.

DNS 124 refers to a protocol that converts domain names into IP addresses on the internet. When the user enters a website address, DNS 124 retrieves the IP address of the server connected to the corresponding domain, enabling access to the webpage. DNS 124 has a hierarchical structure, allowing multiple DNS servers to efficiently perform address translation. However, the attacker may provide incorrect IP addresses through DNS spoofing or disable DNS servers through DDOS attacks.

DNS 124, as a resource owned by a third party other than the attacker, may serve as compromised attack infrastructure breached by the attacker.

| Feature | Value |
| --- | --- |
| Category | dns-scanner |
| Port No. | 53 |
| Protocol | UDP |

When the first data is '53,' the second data is 'UDP,' and the third data is 'dns-scanner,' the attack infrastructure corresponding to the first data, the second data, and the third data may be classified as DNS 124.

NTP 125-related attack infrastructure corresponding to the first data, the second data, and the third data will hereinafter be described.

NTP 125, which is a protocol used to synchronize clocks in a computer network, provides accurate time information via the internet or a local network. NTP 125 adjusts time differences between clients and servers to maintain consistent system clocks and increases synchronization accuracy by using multiple time servers. However, NTP 125 has potential vulnerabilities that can be exploited by the attacker. The attacker may use NTP 125 to conduct DDOS attacks or inject incorrect time information to manipulate system logs.

NTP 125, as a resource owned by a third party other than the attacker, may serve as compromised attack infrastructure breached by the attacker.

| Feature | Value |
| --- | --- |
| Category | — |
| Port No. | 123 |
| Protocol | UDP |

When the first data is '123' and the second data is 'UDP,' the attack infrastructure corresponding to the first data, the second data, and the third data may be classified as NTP 125.

According to the classification model of the present disclosure, attack infrastructure can be easily determined by referencing information on port numbers, protocols, and categories recorded in network traffic data. Thus, according to this embodiment, resources used by the attacker during a security incident can be automatically classified based on a predefined classification model. As a result, resources used by the attacker can be quickly identified, thereby strengthening the security of network equipment, including the host device 20.

In one embodiment, the attack infrastructure identification unit 12 may map the identified attack infrastructure to TTPs defined in the MITRE Adversarial Tactics, Techniques, and Common Knowledge (ATT&CK).

The TTPs defined in the MITRE ATT&CK framework are used to segment and understand the behavioral pattern of the attacker. By mapping the identified attack infrastructure to TTPs based on the MITRE ATT&CK framework, the attack infrastructure identification unit 12 can clearly identify the attacker's intent and methods. The MITRE ATT&CK framework, which systematically categorizes TTPs, serves as a standardized tool for threat detection and analysis. Mapping attack infrastructure to TTPs allows for more sophisticated threat analysis.

Here, tactics represent highest-level strategies used by the attacker to achieve a specific goal. Techniques are concrete methods used to implement tactics, and procedures are detailed steps taken by a specific attacker to execute tactics and techniques.

The attack infrastructure identification unit 12 may map the identified attack infrastructure to TTPs defined in the MITRE ATT&CK framework based on a specific IP or domain of the identified attack infrastructure. For example, if the specific IP or domain is identified as a C2 server, the identified attack infrastructure may be mapped to C2 tactic. In another example, the identified attack infrastructure may be mapped to an application layer protocol technique depending on the protocol (e.g., TCP/UDP) used.

The attack infrastructure identification unit 12 may map the identified attack infrastructure to TTPs based on port numbers or protocols. For example, frequently used ports (e.g., 8080 or 53) or protocols (e.g., DNS or HTTP) may be checked, thereby mapping the identified attack infrastructure to a technique such as Exfiltration Over C2 Channel using a specific protocol.

The attack infrastructure identification unit 12 may map the identified attack infrastructure to TTPs based on category information. For example, the attack infrastructure identification unit 12 may analyze an abnormal traffic pattern such as DNS tunneling or an HTTP request pattern and map it to a specific technique (e.g., Data Obfuscation or Dynamic Resolution) in the MITRE ATT&CK framework.

According to the present embodiment, mapping attack infrastructure to TTPs in the MITRE ATT&CK framework allows for a clearer understanding of the attacker's intent and strategy, enabling the design of precise countermeasures. Thus, the present embodiment can be effective in strengthening defense systems.

In one embodiment, if the attack infrastructure corresponding to the first data (port number information), the second data (protocol information), and the third data (textual information from network packets or information provided by network equipment) is not defined in the predefined classification model, the attack infrastructure identification unit 12 may automatically update the predefined classification model.

The attack infrastructure identification unit 12 may receive the threat intelligence data stored in the external database 40 and automatically update the predefined classification model using the threat intelligence data.

The threat intelligence data may provide critical information for preventing and responding to cyberattacks. By automatically updating the predefined classification model using the threat intelligence data, the attack infrastructure identification unit 12 can identify attack infrastructure such as IP addresses, domains, and file hashes while maintaining accuracy and latest information through integration with external data. Accordingly, the present embodiment has the advantage of enhancing the organization's cyber defense capabilities.

Figure 6:
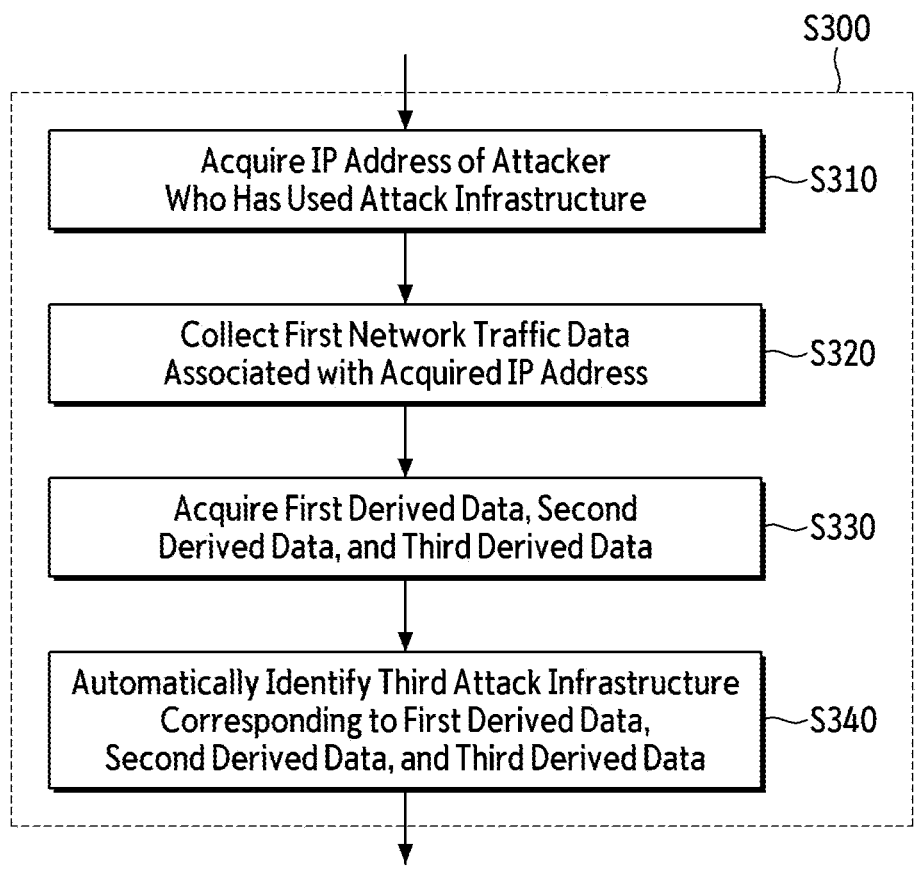
FIG. 6 is a detailed flowchart illustrating the method for identifying attack infrastructure according to some embodiments of the present disclosure, described with reference to FIG. 2.

The method for identifying attack infrastructure according to some embodiments of the present disclosure will hereinafter be described in further detail with reference to FIG. 6. FIG. 6 is a detailed flowchart illustrating the method for identifying attack infrastructure according to some embodiments of the present disclosure, as described with reference to FIG. 2.

Referring to FIG. 6, the attack infrastructure identification unit 12 may acquire the IP address of the user who has utilized the identified attack infrastructure (S310).

Thereafter, the attack infrastructure identification system 10 may acquire first network traffic data associated with the acquired IP address (S320). Step S310 may be identical to step S100 described with reference to FIG. 2, and thus, a detailed description thereof will be omitted.

Thereafter, the attack infrastructure identification unit 12 may acquire, from the first network traffic data, first derived data regarding port numbers recorded in the first network traffic data, second derived data regarding protocols recorded in the first network traffic data, and third derived data regarding textual information included in network packets recorded in the first network traffic data or category information provided by network equipment (S330). Step S330 may be identical to step S200 described with reference to FIG. 2, and thus, a detailed description thereof will be omitted.

Thereafter, the attack infrastructure identification unit 12 may automatically identify third attack infrastructure corresponding to the first derived data, the second derived data, and the third derived data by using a predefined classification model (S340). Step S340 may be identical to step S300 described with reference to FIG. 2, and thus, a detailed description thereof will be omitted.

Figure 7:
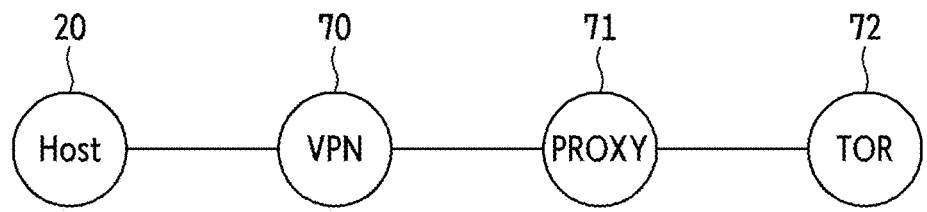
FIG. 7 is a diagram illustrating attack infrastructure identified according to the method for identifying attack infrastructure according to some embodiments of the present disclosure.

Results of the embodiment described with reference to FIG. 6 will now be explained with reference to FIG. 7. FIG. 7 is a diagram illustrating attack infrastructure identified according to the method for identifying attack infrastructure according to some embodiments of the present disclosure.

Referring to FIG. 7, the traffic data collection unit 11 may collect network traffic data of the host device 20, which is the target of a security incident. Thereafter, the attack infrastructure identification unit 12 may acquire, from the network traffic data, first data regarding port numbers recorded in the network traffic data, second data regarding protocols recorded in the network traffic data, and third data regarding textual information included in network packets recorded in the network traffic data or category information provided by network equipment. Thereafter, the attack infrastructure identification unit 12 may identify VPN 70 as attack infrastructure corresponding to the first data, the second data, and the third data, using the aforementioned predefined classification model.

Meanwhile, the attack infrastructure identification system 10 may acquire the attacker's IP address using the identified attack infrastructure, VPN 70. The attack infrastructure identification system 10 may acquire first network traffic data associated with the acquired IP address. The attack infrastructure identification unit 12 may acquire, from the first network traffic data, first derived data regarding port numbers recorded in the first network traffic data, second derived data regarding protocols recorded in the first network traffic data, and third derived data regarding textual information included in network packets recorded in the first network traffic data or category information provided by network equipment. Thereafter, the attack infrastructure identification unit 12 may identify Proxy 71 as attack infrastructure corresponding to the first derived data, the second derived data, and the third derived data, using the aforementioned predefined classification model.

In this manner, the attack infrastructure identification system 10 may additionally identify TOR 72 as attack infrastructure utilized by the attacker.

According to the present embodiment, all attack infrastructure utilized by the attacker during a security incident can be identified, and security measures can be taken for all the identified attack infrastructure, thereby enhancing the security of the network that includes the host device 20.

An exemplary computing system 1000 capable of implementing the attack infrastructure identification system 10 according to some embodiments of the present disclosure will hereinafter be described with reference to FIG. 8.

Figure 8:
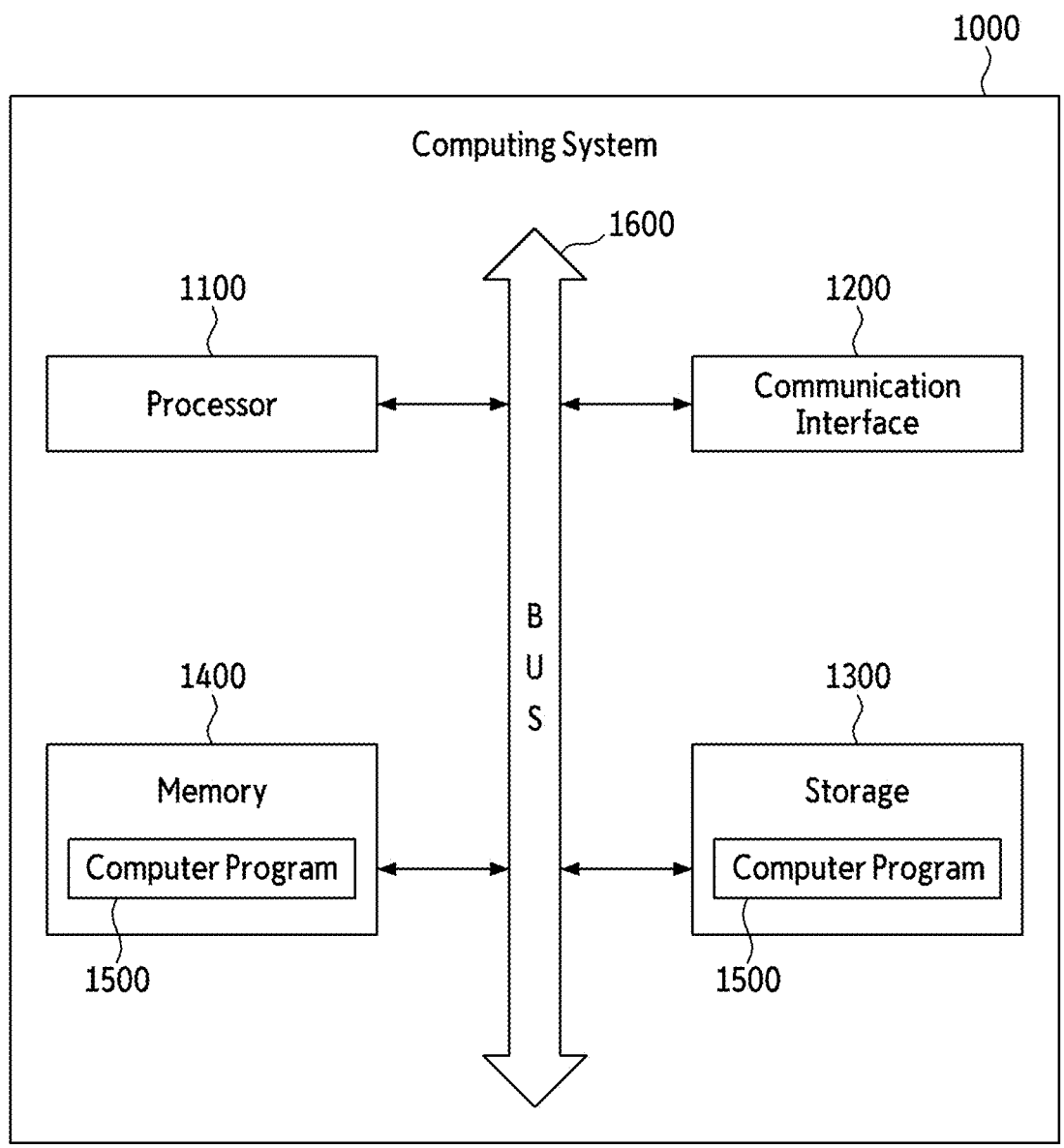
FIG. 8 is a diagram illustrating an exemplary computing system capable of implementing systems according to some embodiments of the present disclosure.

FIG. 8 is an exemplary hardware configuration diagram of the computing system 1000.

Referring to FIG. 8, the computing system 1000 may include at least one processor 1100, a system bus 1600, a communication interface 1200, a memory 1400 that loads a computer program 1500 executed by the processor 1100, and a storage 1300 that stores the computer program 1500.

The computing system 1000 of FIG. 8 may represent the hardware structure of one or more computing devices that constitute the attack infrastructure identification system 10 described with reference to FIG. 1.

The processor 1100 controls the overall operation of each component of the computing device 1000. The processor 1100 may perform calculation for at least one application or program for executing methods/operations according to various embodiments of the present disclosure. The memory 1400 stores various data, commands, and/or information. The memory 1400 may load at least one computer program 1500 from the storage 1300 to execute the methods/operations according to various embodiments of the present disclosure. The storage 1300 may non-transitorily store the computer program 1500.

The computer program 1500 may include one or more instructions implementing the methods/operations according to various embodiments of the present disclosure. When the computer program 1500 is loaded into the memory 1400, the processor 1100 may execute the one or more instructions to perform the methods/operations according to various embodiments of the present disclosure.

In one embodiment, the computer program 1500 may include instructions performing the operations of: collecting network traffic data of a host device that is the target of a security incident; acquiring, from the network traffic data, first data regarding port numbers recorded in the network traffic data, second data regarding protocols recorded in the network traffic data, and third data regarding textual information included in network packets recorded in the network traffic data or category information provided by network equipment; and automatically identifying attack infrastructure corresponding to the first data, the second data, and the third data by using a predefined classification model, wherein the attack infrastructure corresponds to resources utilized by the attacker during the security incident.

In some embodiments, the computing system 1000 may be configured using one or more physical servers in a server farm based on a cloud technology such as virtual machines. In this case, some of the processor 1100, the memory 1400, and the storage 1300 may be virtual hardware, and the communication interface 1200 may also be implemented as a virtualized networking element such as a virtual switch.

So far, a variety of embodiments of the present disclosure and the effects according to embodiments thereof have been mentioned with reference to FIGS. 1 to 10. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for identifying attack infrastructure, performed by a computing system, the method comprising:
   collecting network traffic data of a host device that is the target of a security incident;
   acquiring, from the network traffic data, first data regarding port numbers recorded in the network traffic data, second data regarding protocols recorded in the network traffic data, and third data regarding textual information included in network packets recorded in the network traffic data or category information provided by network equipment;
   automatically identifying attack infrastructure corresponding to the first data, the second data, and the third data by using a predefined classification model; and
   blocking network access of an Internet Protocol (IP) address associated with the attack infrastructure,
   wherein the attack infrastructure corresponds to resources utilized by an attacker during the security incident,
   wherein the predefined classification model includes first attack infrastructure used to attack a network and second attack infrastructure compromised by the attacker,
   wherein each of the first attack infrastructure and the second attack infrastructure includes a plurality of attack infrastructures corresponding to different data, and
   wherein the automatically identifying the attack infrastructure comprises: identifying the first attack infrastructure or the second attack infrastructure; and identifying third attack infrastructure corresponding to the first data, the second data, and the third data among the plurality of attack infrastructures included in the identified attack infrastructure.

2. The method of claim 1, wherein the attack infrastructure includes the first attack infrastructure, which is a resource owned by the attacker to attack the network that includes the host device.

3. The method of claim 2, wherein the first attack infrastructure includes at least one of Virtual Private Network (VPN), The Onion Router (TOR), proxy, Layer 2 Tunneling Protocol (L2TP), Point-to-Point Tunneling Protocol (PPTP), and botnet.

4. The method of claim 1, wherein
   the attack infrastructure includes the second attack infrastructure, which is a resource owned by a third party other than the attacker and compromised by the attacker.

5. The method of claim 4, wherein the second attack infrastructure includes at least one of Network-Attached Storage (NAS), malware, web hosting, Domain Name System (DNS), Network Time Protocol (NTP) server, and network equipment.

6. The method of claim 1, further comprising:
   mapping the identified attack infrastructure to Tactics, Techniques, and Procedures (TTPs) in the MITRE Adversarial Tactics, Techniques, and Common Knowledge (ATT&CK) framework.

7. The method of claim 1, wherein the automatically identifying the attack infrastructure further comprises: updating the predefined classification model automatically if the attack infrastructure corresponding to the first data, the second data, and the third data is not defined in the predefined classification model.

8. The method of claim 1, wherein the automatically identifying the attack infrastructure further comprises: acquiring an IP address of the attacker who has used the attack infrastructure; collecting first network traffic data associated with the acquired IP address; acquiring, from the first network traffic data, first derived data regarding port numbers recorded in the first network traffic data, second derived data regarding protocols recorded in the first network traffic data, and third derived data regarding textual information included in network packets recorded in the first network traffic data or category information provided by network equipment; and automatically identifying fourth attack infrastructure corresponding to the first derived data, the second derived data, and the third derived data by using the predefined classification model.

9. A system for identifying attack infrastructure, comprising:
a communication interface;
a memory in which a computer program is loaded; and
at least one processor executing the computer program, wherein
the computer program includes instructions for performing the operations of:
collecting network traffic data of a host device that is the target of a security incident;
acquiring, from the network traffic data, first data regarding port numbers recorded in the network traffic data, second data regarding protocols recorded in the network traffic data, and third data regarding textual information included in network packets recorded in the network traffic data or category information provided by network equipment; automatically identifying attack infrastructure corresponding to the first data, the second data, and the third data by using a predefined classification model; and
blocking network access of an Internet Protocol (IP) address associated with the attack infrastructure,
the attack infrastructure corresponds to resources utilized by an attacker during the security incident,
the predefined classification model includes first attack infrastructure used to attack a network and second attack infrastructure compromised by the attacker, and
each of the first attack infrastructure and the second attack infrastructure includes a plurality of attack infrastructures corresponding to different data, and
wherein the operation of automatically identifying the attack infrastructure comprises: identifying the first attack infrastructure or the second attack infrastructure; and identifying attack infrastructure corresponding to the first data, the second data, and the third data among the plurality of attack infrastructures included in the identified attack infrastructure.

10. The system of claim 9, wherein the attack infrastructure includes the first attack infrastructure, which is a resource owned by the attacker to attack the network that includes the host device.

11. The system of claim 10, wherein the first attack infrastructure includes at least one of Virtual Private Network (VPN), The Onion Router (TOR), proxy, Layer 2 Tunneling Protocol (L2TP), Point-to-Point Tunneling Protocol (PPTP), and botnet.

12. The system of claim 9, wherein the attack infrastructure includes the second attack infrastructure, which is a resource owned by a third party other than the attacker and compromised by the attacker.

13. The system of claim 12, wherein the second attack infrastructure includes at least one of Network-Attached Storage (NAS), malware, web hosting, Domain Name System (DNS), Network Time Protocol (NTP) server, and network equipment.

14. The system of claim 9, wherein the computer program further includes instructions for performing the operation of mapping the identified attack infrastructure to Tactics, Techniques, and Procedures (TTPs) in the MITRE Adversarial Tactics, Techniques, and Common Knowledge (ATT&CK) framework.

15. The system of claim 9, wherein the operation of automatically identifying the attack infrastructure further comprises: updating the predefined classification model automatically if the attack infrastructure corresponding to the first data, the second data, and the third data is not defined in the predefined classification model.

16. The system of claim 9, wherein the operation of automatically identifying the attack infrastructure further comprises: acquiring an IP address of the attacker who has used the attack infrastructure; collecting first network traffic data associated with the acquired IP address; acquiring, from the first network traffic data, first derived data regarding port numbers recorded in the first network traffic data, second derived data regarding protocols recorded in the first network traffic data, and third derived data regarding textual information included in network packets recorded in the first network traffic data or category information provided by network equipment; and automatically identifying fourth attack infrastructure corresponding to the first derived data, the second derived data, and the third derived data by using the predefined classification model.

17. A non-transitory computer-readable recording medium storing computer program executable by at least one processor to perform:
collecting network traffic data of a host device that is the target of a security incident;
acquiring, from the network traffic data, first data regarding port numbers recorded in the network traffic data, second data regarding protocols recorded in the network traffic data, and third data regarding textual information included in network packets recorded in the network traffic data or category information provided by network equipment;
automatically identifying attack infrastructure corresponding to the first data, the second data, and the third data by using a predefined classification model; and
blocking network access of an Internet Protocol (IP) address associated with the attack infrastructure,
wherein the attack infrastructure corresponds to resources utilized by an attacker during the security incident,
wherein the predefined classification model includes first attack infrastructure used to attack a network and second attack infrastructure compromised by the attacker,
wherein each of the first attack infrastructure and the second attack infrastructure includes a plurality of attack infrastructures corresponding to different data, and wherein the automatically identifying the attack infrastructure comprises: identifying the first attack infrastructure or the second attack infrastructure; and identifying attack infrastructure corresponding to the first data, the second data, and the third data among the plurality of attack infrastructures included in the identified attack infrastructure.

* * * * *